UNITED STATES PATENT OFFICE.

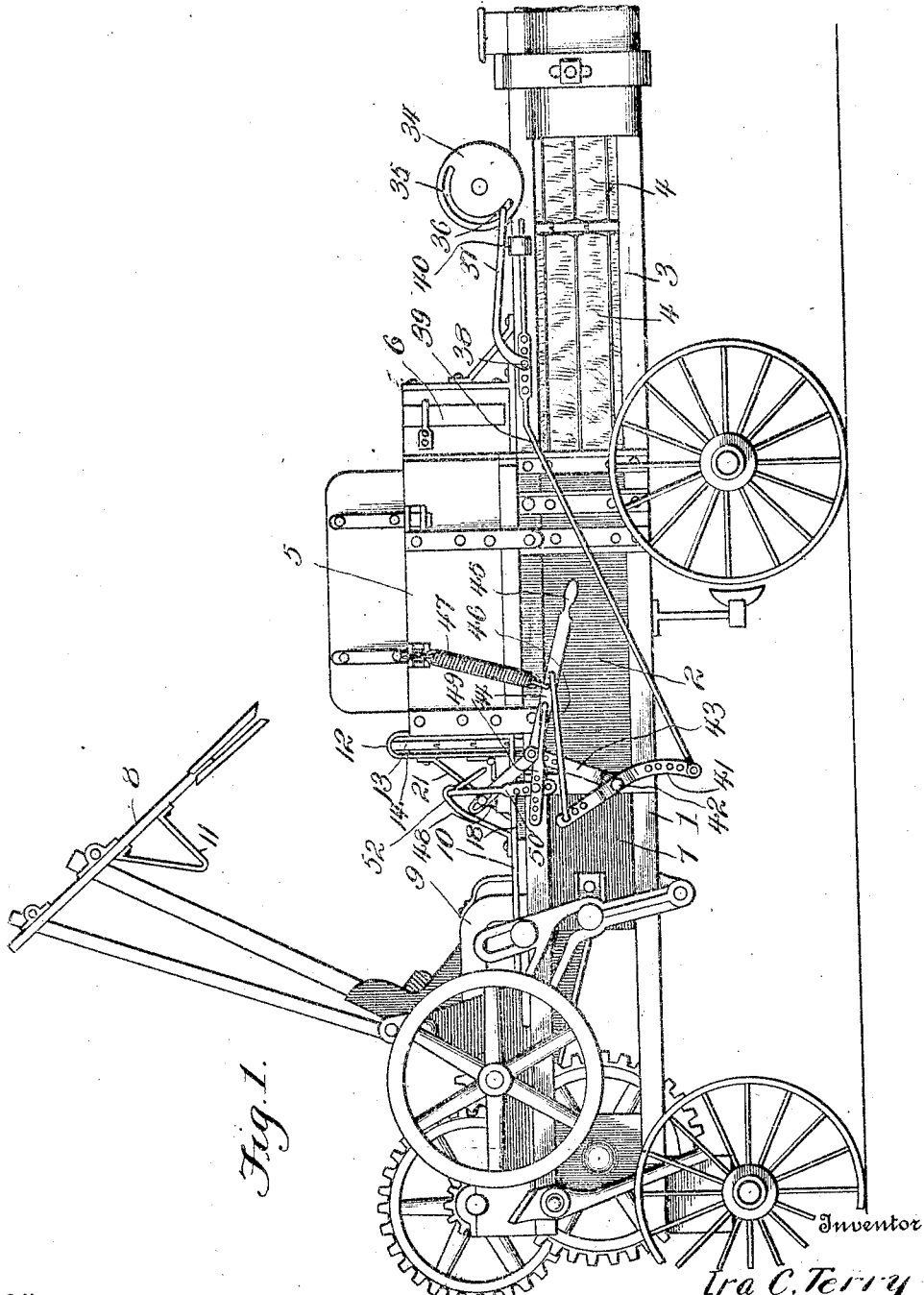

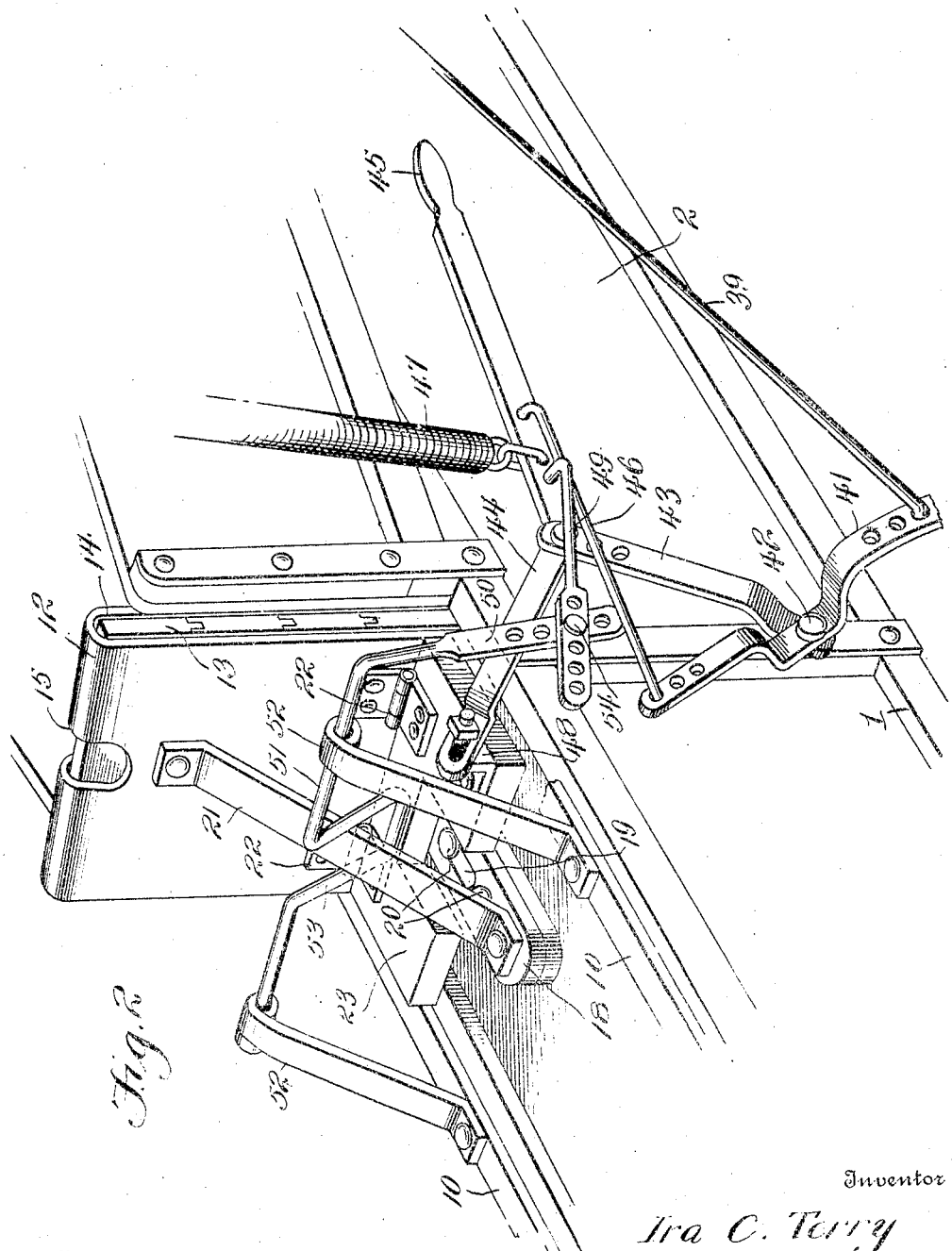

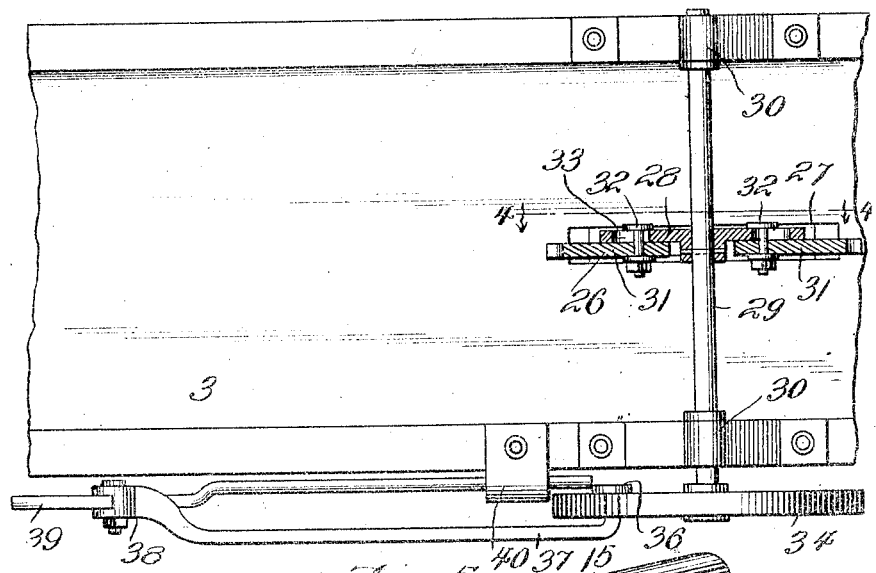
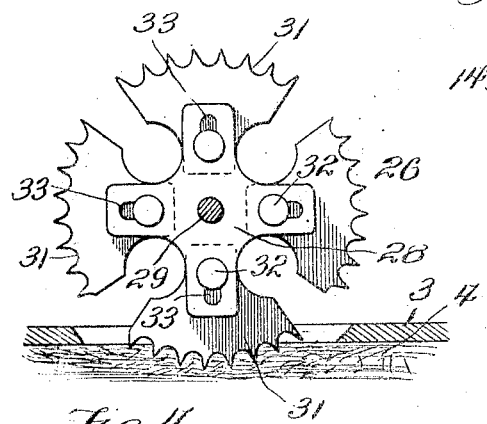
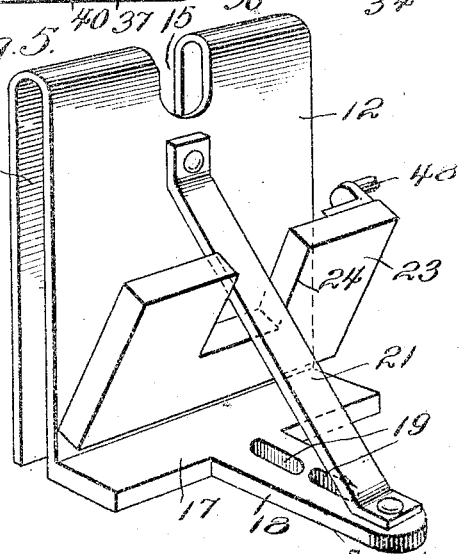

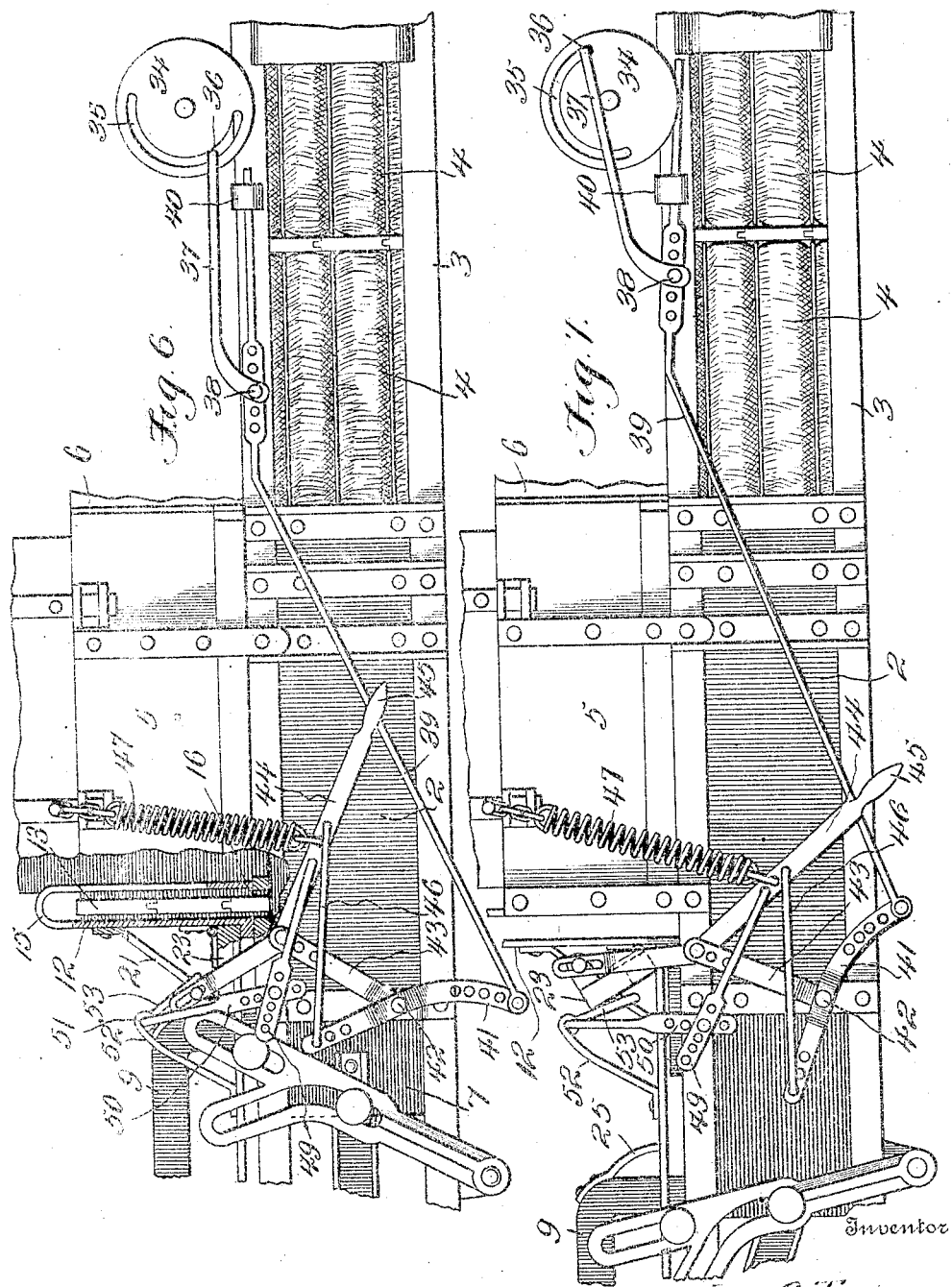

IRA COLE TERRY, OF MONROE, LOUISIANA.

HAY-PRESS.

986,873.     Specification of Letters Patent.     Patented Mar. 14, 1911.

Application filed July 22, 1910. Serial No. 573,304.

*To all whom it may concern:*

Be it known that I, IRA COLE TERRY, a citizen of the United States, residing at Monroe, in the parish of Ouachita and State of Louisiana, have invented new and useful Improvements in Hay-Presses, of which the following is a specification.

This invention relates to hay presses, and particularly to means for automatically dropping or inserting in position between the bales of hay the division boards or blocks employed to separate the bales.

The primary object of the invention is to provide means for moving the cage which holds the block at the proper moment over the opening in the bale chamber through which the division block is dropped into said chamber, such means acting in timed accord with the plunger and beater or feeder whereby the insertion of the block at the exact time is secured and liability of damage to the press as a result of the insertion of the block at an improper time obviated.

With these and other objects in view, the invention consists of the features of construction, combination and arrangement of parts hereinafter fully described and claimed, reference being had to the accompanying drawings, in which:—

Figure 1 is a side elevation of a hay press embodying my invention, showing the parts of the dropping mechanism disposed for the forward movement of the cage to dropping position by the plunger. Fig. 2 is an enlarged detail perspective view of the cage and associated parts of the dropping mechanism. Fig. 3 is a top plan view on an enlarged scale, showing the primary operating devices, parts appearing in section. Fig. 4 is a section on the line 4—4 of Fig. 3. Fig. 5 is a detail view of the cage or block holder. Figs. 6 and 7 are views on an enlarged scale showing the different positions of the parts of the dropping mechanism when the cage is disposed in normal and dropping positions.

Referring to the drawings, 1 designates the frame of a hay press of that type having a baling chamber 2 provided with an extension 3 through which the formed bales 4 move prior to discharge, and having a hopper 5 communicating with the top of the baling chamber for the feed of the hay thereto, said hopper being equipped with a condenser 6 of any suitable construction and operated in any preferred manner.

7 designates the plunger which compresses the hay in the baling chamber to form the bale, and 8 the pivotally mounted beater or feeder which forces the hay from the hopper into the baling chamber. This beater or feeder is mounted for pivotal movement on the frame and is pivotally connected with actuating bracket arms 9 connected to and movable with the plunger and slidably mounted in guideways formed between the top of the frame and horizontal guide strips 10 secured thereto. The feeder is provided with the usual striker 11 adapted to engage and force the division block from its cage or holder into the baling chamber, as hereinafter described.

The rear wall of the hopper is formed by a cage 12 which is adapted to hold the division block 13 which is to be introduced. This cage is provided with a side opening 14 for the insertion of the block and with a slot or opening 15 in its top for the entrance of the striker 11 when the cage is in dropping position, to force the block down into the baling chamber. In the present instance, I have shown the application of my invention to a press in which the cage 12 is movable forwardly through the action of the plunger over an opening 16 through which the division block is introduced into the baling chamber, but with slight variations in the form and construction of the parts, the invention may be employed in connection with presses whose cages are shifted into and out of dropping position by a tilting, an oscillatory or any other kind of motion. In this case the cage is fixed at its base to a carrier block or plate 17 having a central rear extension 18 provided with slots 19 loosely receiving bolts 20, by which said block is slidably mounted upon the hay chamber frame to permit a limited back and forth movement of the cage. The body of the cage is connected with the free extremity of the arm by an inclined brace 21, which also serves as a contact arm or member by which the cage may be shifted, as hereinafter described. Hinged or pivoted to the lower rear portion of the cage, as at 22, is a contact plate or apron 23 normally having the upwardly tilted position shown in Fig. 6 and provided with a central slot or recess 24 to receive and accommodate the brace 21 when it is so tilted. The said contact plate or apron is adapted to be swung downward to a horizontal position to lie in the path of contact springs 25 carried by the bracket arm 9, so that at the proper time period the cage will be shifted forwardly to dropping position. In its normal upwardly inclined position, the apron lies out of the path of movement of the contact springs, so that the bracket arms may reciprocate back and forth for the operation of the beater or feeder by the plunger without affecting the cage or coming in contact with the apron.

The mechanism for depressing the apron to shift the cage to dropping position and for retracting the apron and returning the cage to normal position comprises a toothed operating wheel or disk 26 the lower edge of which projects downward through a slot 27 in the top of the extension 3 so as to be engaged by the underlying moving bale 4, by which the wheel will be turned in a retrograde direction. The wheel is preferably composed of an armed spider or hub 28 fixed to a shaft 29 journaled in suitable bearings 30, and a series of toothed segments 31 each having a reduced portion secured to one of the arms of the spider by a bolt 32, which is adjustable in a slot 33 formed in the spider arm, whereby the segment may be radially adjusted with relation to the shaft 29. By this construction the diameter of the toothed wheel may be varied, as circumstances may require, to vary the speed of rotation of the wheel to operate the parts of the dropping mechanism controlled thereby at different periods or at greater or less intervals in the operation of the machine.

The shaft 29 is provided at one end with a crank disk 34 having an arcuate slot 35 receiving a suitable wrist projection 36 on the free end of a pitman 37, the opposite end of which is adjustably pivoted, as at 38, to the adjacent end of a rod 39, which end of the rod is slidably mounted in a guide 40 on the adjacent side of the frame. The opposite end of the rod is bent downwardly and rearwardly at an angle and is pivotally connected to the lower end of a compoundly curved vibratory operating lever 41 fulcrumed between its curved arms on a bolt or fixed fulcrum pin 42 carried by the frame. On this bolt or pin is also fulcrumed at its lower end a swinging bar or post 43 to the upper end of which is intermediately fulcrumed an inclined trip or shifting lever 44. The lower forward end of the lever 44 is formed to provide a handle 45 for manual adjustment in initially setting the parts and is connected with the upper rear arm of the operating lever 41 by a link 46 and with the hopper or any suitable portion of the frame by a coiled spring 47, operating when permitted to throw said lever to shifting position. The upper rear end of the lever 44 is pivotally connected with a crank arm 48 on the contact plate or apron 23, by which the movement of said lever to shifting position will effect the depression of said apron into the path of the contact springs 25. As the lever 44 is connected with the apron in the manner described, it obviously must be free to shift forward and backward with the cage 12, which freedom of motion is permitted by fulcruming said lever upon the swinging support 43. Where the cage is shifted into and out of dropping position in any other than by a back and forth reciprocating motion, the mode of mounting the lever 44 may vary as occasion demands. It will be understood, of course, that the spring 47 permits of the shifting movement described and supports the lever 44 and coöperating parts in proper position, in addition to its function of depressing the contact apron, the construction therefore being such as to permit ample flexibility of motion of the operating part to prevent liability of the same hanging and become injured in their operative movements. The lower arm of the lever 44 is further connected by a link 49 with a crank arm 50 formed or provided upon one end of a rock shaft 51 journaled in suitable bearings at the forward end of bracket arms 52 fixed to the adjacent ends of the guide bars 10 and extending at an upward and forward angle therefrom so as to leave sufficient space beneath them for the free movements of the apron and contact springs. The shaft 51 is provided with a crank or U-shaped portion 53 which extends beneath the brace or contact arm 21 and is adapted to act thereon when the shaft is rocked forwardly to shift the cage rearwardly from dropping to normal position. The connection between the link 49 and arm 50 is preferably of an adjustable type in order that the extent of throw of the crank 53 may be varied to shift the cage the required distance and no more. Such a connection may be provided, as shown in Fig. 2, by forming the pivotally connected ends of the link and arm with a series of openings for the passage of the pivot pin or bolt 54.

In the operation of the press, it will be understood that the beater and plunger operate in the usual way to feed and compress the material. Assuming that the parts of the dropping mechanism are in the normal position shown in Fig. 7, with the wrist pin 36 at the limit of its downward movement and the rear end of the slot 35 of the disk 34 in engagement therewith, it will be understood that on the upward and rearward movement of said crank disk and pin in the rotation of the operating wheel 26 by the feeding bales 4, the pull upon the connecting rod 39 during the ensuing half revolution of the wheel causes the lower arm of the operating lever 41 to be swung upwardly, by which the lower front arm of the lever 44 will be drawn downward against the resistance of the spring 47, thus placing said spring under tension and disposing the upper arm of the lever 44 at the limit of its upward movement to hold the apron 23 tilted upwardly or retracted, thus allowing the spring contacts 25 to have movement with the plunger and feeder without affecting the cage 12. In such position of the lever 44 the crank arm 50 will be drawn forward by the action of the link 49 to dispose the crank 53 of the shaft 51 at a sufficient point in advance of the contact arm 21 to permit the cage to be shifted forward to dropping position without interference therefrom. When, however, the wrist-pin 36 reaches the highest point in its path of movement, as shown in Fig. 1, and the slot 35 is disposed in rear of the vertical center of the crank disk, the spring 57 is free to contract and draws the long arm of lever 44 upward, thereby communicating reverse motion to the lever 41 and pulling the rod 39 rearwardly, thus bringing the pin 36 down into the forward end of the slot, so that the crank disk will continue to move without affecting the wrist-pin, which remains at rest until again engaged by the rear end of the slot. Such movement of the lever 44 swings the rear arm of said lever downwardly, bringing the apron 23 to a horizontal position and simultaneously turning the shaft 51 to move the crank 53 forward. Hence on the ensuing forward movement of the plunger, and while the beater or feeder is at rest, the contact springs 25 will engage the apron and force the cage forwardly into dropping position above the opening 16, as illustrated in Fig. 6, allowing the division board or block 13 to drop from the cage through said opening onto the plunger, by which it will be temporarily supported. When the plunger moves rearwardly the block will be released and will drop down into the baling chamber in rear of the compressed material or will be forced downward thereinto by the striker 11 on the downward movement of the feeder 8 which occurs at this time. It will thus be seen that the block will be dropped at the proper moment to be moved forward with the material by the plunger on its subsequent stroke, so that the liability of damage to the apparatus by the dropping of the block at an improper time in the movement of the plunger will be effectually obviated. As the plunger moves forwardly again the rear end of the slot 35 again engages the wrist pin, transmits forward motion to the rod 39 through the link 37 to return the levers 41 and 44 to normal position and again place the spring 47 under tension, in which operation the apron will be tilted upwardly to an inoperative position and the crank 53 swung rearwardly to retract the cage, thus resetting the parts for subsequent operation. It will be understood that at this stage when the cage is retracted the attendant or operator inserts another block in the cage for insertion into the baling chamber upon the ensuing movement thereof.

From the foregoing description, taken in connection with the drawings, the construction and mode of operation of the block dropping mechanism constituting my invention will be readily understood, and it will be seen that a mechanism of this character is provided which is positive in action and operated in timed accord with the movements of the plunger and feeder for inserting a division block in position at the proper time in the operation of the press, thus preventing any possibility of injury to the press from the insertion of a block at an improper period in the operation of the plunger.

While the invention is primarily designed for use in connection with presses of the type described, it is obvious that by modifications falling within the scope and spirit of my invention the mechanism may be adatped for effective use in connection with other types of presses employing different movements of the blockage in its shifting actions. I, therefore, reserve the right to employ modifications falling within the spirit and scope of the appended claims.

I claim:—

1. In a division block inserting device for baling presses, the combination with a baling chamber, of a block holder movable toward and from an opening in the baling chamber, plunger-operated means for projecting said holder, and automatic means operative to render said plunger-operated means effective at a predetermined time in the action of the plunger.

2. In a division block inserting device for baling presses, the combination with a baling chamber having an opening therein, and a baling plunger, of a block holder movable toward and from said opening, plunger controlled means normally inoperative for projecting the block holder, and automatic means controlled in the baling operation for rendering said plunger controlled means operative to project the holder.

3. In a division block inserting device for baling presses, the combination with a baling chamber having an opening therein, and a baling plunger; of a block holder movable toward and from said opening, plunger-operated means for projecting the block holder, automatic means controlled by the baling operation for rendering said plunger-operated means effective, and means for returning the holder to normal position after projection.

4. In a division block inserting device for baling presses, the combination with a baling chamber having an opening therein, and a baling plunger, of a block holder movable toward and from the opening, a plunger-operated device for projecting the block holder, a contact adapted to be engaged by said device for moving the block holder, means for normally holding said contact out of the path of movement of said device, and automatic means controlled in the baling operation to adjust said holding means to project the contact into the path of said plunger-operated device.

5. In a division block inserting device for baling presses, the combination with a baling chamber having an opening therein, and a baling plunger, of a block holder movable toward and from said opening, a movable contact carried thereby, a plunger-operated device to engage said contact and project the block holder, means for normally holding the block holder retracted and the contact out of the path of movement of said device, and means operated by the movement of a formed bale in the press for controlling said holding means to periodically release the block holder for movement and move said contact into the path of the plunger-operated device.

6. In a division block inserting device for baling presses, a block holder, plunger-operated means for projecting the same, means for normally holding the block holder retracted and in condition to be unaffected by said plunger-operated means, and automatic means controlled in the baling operation for controlling the first-named means to adapt the holder to be projected by said plunger-operated means.

7. In a division block inserting device for baling presses, the combination with a baling chamber having an inlet, and a compressing plunger, of a block holder movable toward and from said inlet, a movable contact carried by said holder, a plunger-operated device to engage the contact, spring actuated means for normally holding said contact out of the path of movement of said device and maintaining the block holder in retracted position, and means operated by the movement of a formed bale in the press for retracting the first-named means to project the contact into the path of movement of said device.

8. In a division block inserting device for baling presses, the combination with a baling chamber having an inlet, and a compressing plunger, of a block holder movable toward and from said inlet, a movable contact carried by said holder, a plunger-operated device to engage the contact, spring actuated means for normally holding said contact out of the path of movement of said device and maintaining the block holder in retracted position, a rotary operating element adapted to be actuated by the movement of a formed bale, and means operated by said element to adjust the spring controlled means to permit movement of the block holder and to throw said contact into the path of the plunger-operated device.

9. In a division block inserting device for baling presses, the combination with a baling chamber having an inlet, and a compressing plunger, of a block holder movable toward and from said inlet, a movable contact carried by said holder, a plunger-operated device to engage the contact, devices for retracting the block holder and moving the contact into and out of operative position, a spring retracted system of levers controlling said devices, and means operated by a formed bale for adjusting said system of levers to control said devices for permitting movement of the block holder and projecting said contact into the path of said plunger-operated device.

10. In a division block inserting device for baling presses, the combination with a baling chamber having an inlet, and a compressing plunger, of a block holder movable toward and from said inlet, a movable contact carried by said holder, a plunger-operated device to engage the contact, devices for retracting the block holder and moving the contact into and out of operative position, a spring retracted system of levers controlling said devices, a rotary operating element adapted to be actuated by the movement of a formed bale and a connection between said element and said system of levers for adjusting the latter to set said devices for permitting movement of the block holder and disposing said contact to be engaged by the plunger-operated device.

In testimony whereof I affix my signature in presence of two witnesses.

IRA COLE TERRY.

Witnesses:
 JAMES L. BROOKS,
 CHAS. E. BYNUM.